United States Patent
Hillesland (10) Patent No.: US 9,728,002 B2
(45) Date of Patent: Aug. 8, 2017

(54) TEXEL SHADING IN TEXTURE SPACE (71) Applicant: Advanced Micro Devices, Inc., Sunnyvale, CA (US)

(72) Inventor: Karl Hillesland, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/974,770

(22) Filed: Dec. 18, 2015

(65) Prior Publication Data

US 2017/0178397 A1 Jun. 22, 2017

(51) Int. Cl.
*G06T 15/00* (2011.01)
*G06T 15/80* (2011.01)
*G06T 15/06* (2011.01)
*G06T 1/60* (2006.01)

(52) U.S. Cl.
CPC .............. *G06T 15/80* (2013.01); *G06T 1/60* (2013.01); *G06T 15/06* (2013.01)

(58) Field of Classification Search
CPC ............ G06T 1/60; G06T 15/06; G06T 15/80
USPC ........................................................ 345/426
See application file for complete search history.

(56) References Cited

U.S. PATENT DOCUMENTS

| | | | | |
|---|---|---|---|---|
| 7,133,041 B2 * | 11/2006 | Kaufman | ................. | G06T 15/06 345/419 |
| 7,471,291 B2 * | 12/2008 | Kaufman | ................. | G06T 15/06 345/424 |
| 8,643,659 B1 * | 2/2014 | Baldwin | ................... | G06T 1/60 345/557 |

OTHER PUBLICATIONS

Scherzer, D., Yang, L., Mattausch, O., Nehab, D., Sander, P. V., Wimmer, M., & Eisemann, E. (Dec. 2012). Temporal Coherence Methods in Real-Time Rendering. In Computer Graphics Forum (vol. 31, No. 8, pp. 2378-2408). Blackwell Publishing Ltd.*
Scherzer, Daniel, Lei Yang, and Oliver Mattausch. "Exploiting temporal coherence in real-time rendering." ACM SIGGRAPH Asia 2010 Courses. ACM, 2010.*
Advanced Micro Devices Inc. 2012. AMD Graphics Core Next (GCN) Architecture.
Andersson, M., et al. "Adaptive Texture Space Shading for Stochastic Rendering", Computer Graphics Forum Proceedings of Eurographics 2014, pp. 1-10.
Baker, D., 2005. "Advanced Lighting Techniques." Meltdown 2005, <http://www.slideshare.net/mobius.cn/advanced-lighting-techniques-dan-baker-meltdown-2005.>.
Bishop, G., et al., "Frameless Rendering: Double Buffering Considered Harmful," In Proceedings of the 21st Annual Conference on Computer Graphics and Interactive Techniques, ACM, New York, NY, USA, SIGGRAPH '94, 175-176.
Burns, C.A., et al., "A Lazy Object-Space Shading Architecture with Secoupled Sampling," In Proceedings of the Conference on High Performance Graphics, Eurographics Association 2010, Aire-la-Ville, Switzerland, Switzerland, HPG '10, 19-28.
Carr, N.A., et al. "Meshed Atlases for Real-Time Procedural Solid Texturing," ACM Trans. Graph. 21, No. 2, Apr. 2002, 106-131.

(Continued)

*Primary Examiner* — Phu K Nguyen (57) ABSTRACT

A graphics processing unit is configured to map pixels of a first frame of a video stream to texels, select a subset of the texels for shading based on previously cached texels that were shaded for a second frame, and shade the subset of the texels. The graphics processing unit is also configured to cache the shaded subset of the texels with the previously cached texels and determine values for the pixels of the first frame based on the cached texels.

20 Claims, 6 Drawing Sheets

(56) References Cited

OTHER PUBLICATIONS

Carr, N.A., et al. "GPU Algorithms for Radiosity and Subsurface Scattering", In Proceedings of the ACM SIGGRAPH/Eurographics Conference on Graphics Hardware 2003, Eurographics Association, Aire-la-Ville, Switzerland, Switzerland, HWWS '03, 51-59.
Clarberg, P., and Munkberg, J. 2014. "Deep Shading Buffers on Commodity GPUs." ACM Transactions on Graphics (Proceedings of SIGGRAPH Asia 2014) 33, 6, 227:1-227:12.
Clarberg, P., et al., "A Sort-based Deferred Shading Architecture for Decoupled Sampling" ACM Transactions on Graphics (Proceedings of SIGGRAPH 2013) 2013, 32, 4, 141:1-141:10.
Clarberg, P., et al., 2014 "AMFS: Adaptive Multi-Frequency Shading for Future Graphics Processors", ACM Transactions on Graphics (Proceedings of SIGGRAPH 2014) 33, 4, 141:1-141:12.
Cook, R.L., et al. 1987, "The Reyes Image Rendering Architecture," In Proceedings of the 14th Annual Conference on Computer Graphics and Interactive Techniques, ACM, New York, NY, USA, SIGGRAPH '87, 95-102.
Dayal, A., et al., 2005, "Adaptive Rrameless Rendering," In Proceedings of the Sixteenth Eurographics Conference on Rendering Techniques, Eurographics Association, Aire-la-Ville, Switzerland, Switzerland, EGSR '05, 265-275.
Everitt, C., Sellers, G., McDonald, J., and Foley, T., 2014. "Approaching Zero Driver Overhead in OpenGL." GDC 2014, <http://gdcvault.com/play/1020791/>.
Fatahalian, K., et al. 2010, "Reducing Shading on GPUs using Quad-Fragment Merging," ACM Trans. Graph. 29, Jul. 4, 67:1-67:8.
He, Y., Gu, Y., and Fatahalian, K. 2014. "Extending the Graphics Pipeline with Adaptive," Multi-Rate Shading. ACM Trans. Graph. 33, Jul. 4, 142:1-142:12.
Herzog, R., et al. 2010, "Spatio-Temporal Upsampling on the GPU," In Proceedings of the 2010 ACM SIGGRAPH Symposium on Interactive 3D Graphics and Games, ACM, New York, NY, USA, I3D '10, 91-98.
Hill, S.,2014, "Physically Based Shading in Theory and Practice," In ACM SIGGRAPH 2014 Courses, ACM, Aug. 2014, Vancouver, Canada 2014.
Jimenez, J., et al. 2011, "Filtering Approaches for Real-Time Anti-Aliasing", In ACM SIGGRAPH Courses, 329 pages.
Jones, T.R., et al., "Shadermaps: A Method for Accelerating Procedural Shading," Tech. Rep. Tech. Rep. 2000-TR2000-25, Mitsubishi Electric Research Labs.
Liktor, G., et al. 2012, "Decoupled Deferred Shading for Hardware Rasterization," In Proceedings of the ACM SIGGRAPH Symposium on Interactive 3D Graphics and Games, ACM, New York, NY, USA, I3D '12, 143-150.
Hill, S., et al. Siggraph 2012. Physically Based Shading in Film and Game Production. In ACM SIGGRAPH 2012 Courses, ACM New York, NY, USA, SIGGRAPH '12, 10:1-10:7.
Yang, L., et al. 2009, "Amortized Supersampling," In ACM SIGGRAPH Asia 2009 Papers, ACM, New York, NY, USA, SIGGRAPH Asia '09, 135:1-135:12.
Hill, S., et al. 2013 "Physically Based Shading in Theory and Practice" In ACM SIGGRAPH 2013 Courses, ACM, New York, NY, USA, SIGGRAPH '13, 22:1-22:8.
Nehab, D., et al., 2007, "Accelerating Real-Time Shading with Reverse Reprojection Caching," In Proceedings of the 22Nd ACM SIGGRAPH/Eurographics Symposium on Graphics Hardware, Eurographics Association, Aire-la-Ville, Switzerland, Switzerland, GH '07, 25-35.
Ragan-Kelley, J., et al., 2011, "Decoupled Sampling for Graphics Pipelines," ACM Trans. Graph. 30, May 3, 17:1-17:17.
Scherzer, D., 2007, "Pixel-correct Shadow Maps with Temporal Reprojection and Shadow Test Confidence," In Proceedings of the 18th Eurographics Conference on Rendering Techniques, Eurographics Association, Aire-la-Ville, Switzerland, Switzerland, EGSR'07, 45-50.
Segal, M., 2014, "The OpenGL Graphics System: A Specification,". Khronos Group Inc. Version 4.4 (Core Profile)—Mar. 19, 2014.
Vaidyanathan, K., et al. 2012, "Adaptive Image Space Shading for Motion and Defocus Blur," In Proceedings of the Fourth ACM SIGGRAPH/Eurographics Conference on High-Performance Graphics, Eurographics Association, Aire-la-Ville, Switzerland, Switzerland, EGGH-HPG'12, 13-21.
Vaidyanathan, K., et al., 2014, "Coarse Pixel Shading", In High Performance Graphics, 9-18.

* cited by examiner

TEXEL SHADING IN TEXTURE SPACE

BACKGROUND

Field of the Disclosure

The present disclosure relates generally to graphics processing and, more particularly, to three-dimensional (3-D) graphics processing.

Description of the Related Art

Three-dimensional (3-D) graphics processing represents objects in a scene as a set of vertices that define primitives. For example, a triangle shaped primitive is formed of three vertices linked by three edges. The 3-D model is then projected onto the pixels of a two-dimensional (2-D) plane of a screen used to display the graphics. Shape is conveyed by varying levels of darkness or shading of the pixels in the screen. A shader determines the characteristics of each pixel based on lighting, position, orientation of the objects in the scene, and the camera point-of-view, some or all of which may change from frame-to-frame. Thus, in real-time graphics, the shader performs shading for a triangle by shading each pixel that is covered by the triangle in each frame. Consequently, the cost of shading increases with triangle count, pixel count, and a frame rate used to display the graphics. All of these factors are expected to increase as equipment providers produce higher-resolution displays and monitors that can operate at higher frame rates using higher fidelity models that require higher triangle counts.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Additional detail is typically added to representations of a 3-D scene by mapping images (which are referred to as textures) onto the primitives that represent the scene. Texture mapping is the process by which each pixel in each primitive is mapped to a corresponding portion of a texture that is referred to as a texture pixel or texel. The value of the pixel is then modified by applying textures of the texels to the pixel, e.g., using interpolation and filtering. The speed of the texture mapping process can be increased by caching groups of texels that are expected to be frequently accessed during the texture mapping process. Conventional hardware texture caches are read-only caches that store blocks of texels that are retrieved from the texture that is stored in a slower memory. In some cases, a 3-D graphics processing unit (GPU) can compute values of texels in the texture map and the computed values can be written back to the hardware texture cache, e.g., using conventional cache line invalidation.

The shading work performed by a shader in the 3-D GPU may be reduced by reusing previously shaded values stored in internal hardware buffers. For example, the shader can map each pixel in each primitive to texture pixels (or texels) and apply textures of the texels to the pixel, e.g., using interpolation and filtering. The shader may calculate a texture value for a pixel in a frame and then cache the value in a texture cache for subsequent use by other pixels in the frame. Thus, the shading work may be reduced by reusing texture values calculated for one pixel in other pixels within the same frame. However, reuse of the texels in the texture cache is limited to fragments within the same frame and cached values of the textures used in one frame cannot be reused in another frame. For example, conventional hardware texture caches are sized to cache texture values for pixels within a single frame. Consequently, the conventional hardware texture caches cannot be used to cache texture values across multiple frames because caching of newly calculated texture values for a frame would cause previously calculated texture values to be evicted from the (relatively small) texture cache. Eviction of the previously calculated texture values would then require re-computation of the pixel shading for pixels in subsequent frames that could have reused the previously calculated texture values. Furthermore, conventional hardware texture caches do not cache information that indicates the age of the information in the lines of the texture cache. Thus, a shader cannot determine whether the texture value in the cache line was calculated recently enough to be reused in the current frame.

There are also a number of drawbacks to applying texture reuse in a conventional shader that selects an image resolution (or level-of-detail) for a texture on a per-primitive basis. For example, the texture applied to different pixels may be represented by progressively lower resolution images in portions of the primitive that are further away from the camera point of view and therefore smaller when projected onto the screen. Consequently, when the resolution is selected on a per-primitive basis, mismatches between the resolutions of different pixel values may cause over blurring or under blurring of portions of the primitive if a cached texture value for one pixel is applied to a pixel with a different resolution. Per-primitive selection also generates shading work for portions of the primitive that would normally fail a depth test and not be shaded at all. A resolution may also be selected for each object, but this approach suffers from the same drawbacks as the per-primitive approach, as well as requiring additional geometric constraints, approximations, and computationally intensive geometric operations.

FIGS. 1-6 illustrate real-time rendering of 3-D graphics that includes shading texels associated with a primitive that represents a portion of an object in a 3-D scene, caching information representing the shaded texels, and bypassing shading of previously cached texels associated with the primitive. A shaded texel may be cached by storing the information representing the shaded texel and a frame number to identify the frame in which the texel was shaded. Shading of a texel may then be bypassed if the cached frame number indicates that the texel was shaded within a predetermined number of frames prior to the current frame, e.g., within the last two frames. The cached information representing the shaded texel is then used instead of shading the texel in the current frame, thereby reducing the amount of work performed by the shader. The shaded texels are stored as a texture result. Textures (and, in some cases, texture filtering) may then be applied to the shaded texels in the texture result. In some embodiments, each texel is associated with triangle indices that indicate the triangles that overlap (partially or fully) the texel. The shader can use the triangle index for each texel to retrieve the triangle vertices that are used to interpolate values at the vertices to the location of the texel. Examples of the values that may be interpolated include values of a color, a position of the texel, a normal to the texel, a tangent to the texel, or any other texture coordinate including user-defined texture coordinates. In some embodiments, the cached values of the shaded texels are used to determine values for more than one pixel.

Figure 1:
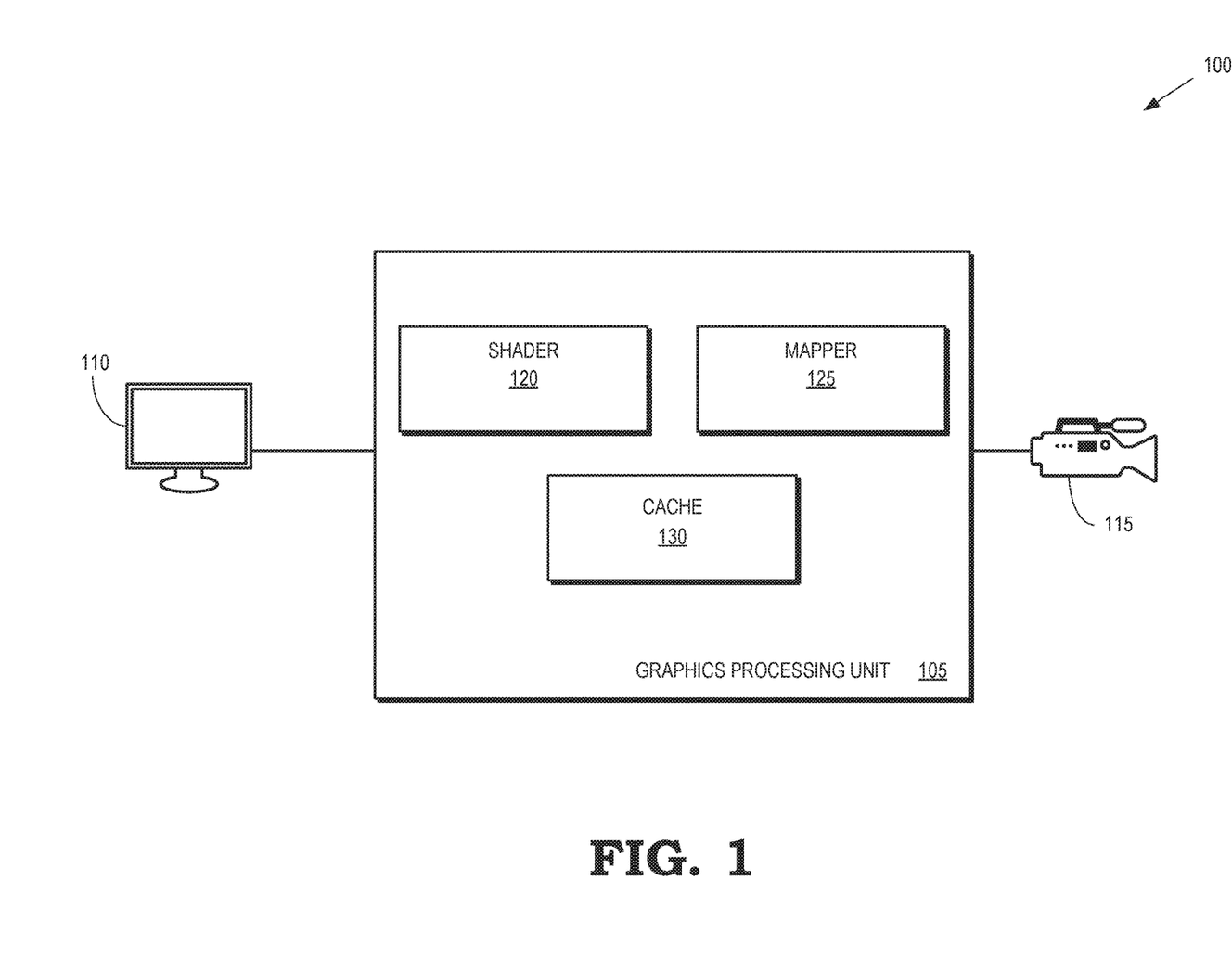
FIG. 1 is a block diagram of a processing system that is used to perform three-dimensional (3-D) graphics processing according to some embodiments.

FIG. 1 is a block diagram of a processing system 100 that is used to perform three-dimensional (3-D) graphics processing according to some embodiments. The processing system 100 includes a graphics processing unit (GPU) 105 that is used to render frames of a video stream for output to a display 110. Although a single GPU 105 shown in FIG. 1, some embodiments of the processing system 100 may include more than one GPU and the multiple GPUs may be used to process information concurrently or in parallel for output to the same display 110 or to one or more different displays (not shown in FIG. 1).

The processing system 100 also includes a video source 115 that generates information representative of the video stream. Although the video source 115 is depicted in FIG. 1 as a separate entity from the GPU 105, some embodiments of the GPU 105 may integrate some or all of the functionality of the video source 115 in the GPU 105. The video source 115 may be a video camera or other device for capturing images that represent a video stream. The video source 115 may also be implemented as a processing unit that generates information representative of images in a video stream. For example, the video source 115 may be a "virtual camera" that is controlled by user input such as a mouse, a keyboard, a joystick, a videogame controller, a head-mounted display (such as Google Glass or Occulus Rift), a pre-determined animation, or other input such as information that is transmitted to the GPU 105 over a network or other wireless connection.

The video source 115 generates 3-D models that are used to represent each frame of the video stream. A 3-D model represents objects in the scene as vertices that define primitives, such as triangles or other polygons. The primitives represent portions of the surface of the object. The video source 115 may also apply rotation, translation, lighting, projection, and the like to position each object within the scene and define the spatial relationships between the objects. Motion is conveyed by changing the position or orientation of the objects from frame to frame. The output of the video source 115 includes a mesh defined by the locations of the vertices of the primitives in three dimensions. The output of the video source 115 may also include information indicating the location or orientation of an observer of the scene for each frame (e.g., a camera or a player in a game) and locations or orientations of light sources that illuminate the scene in each frame. The video source 115 provides the output information to elements of the graphics pipeline, including a shader 120.

Conventional shaders shade each pixel in the display 110 on a per-pixel basis to determine the color, hue, saturation, brightness, contrast, or other properties of each pixel. Shading may be performed based on textures that represent colors, patterns, or other characteristics of a surface. Textures can be represented using techniques such as height mapping, bump mapping, displacement mapping, reflection mapping, and the like. The textures are defined by a texture map that is formed of a set of texture pixels (referred to hereinafter as "texels") that have different values. For example, a value of a texel may represent a color, hue, saturation, brightness, contrast, and the like. The values of texels may also be calculated at different resolutions. For example, a "mipmap" includes a predetermined sequence or hierarchy of textures that represent the same image at progressively lower resolutions. Different textures (or texture maps) are associated with different primitives that are indicated by the mesh of vertices provided by the video source 115. Thus, the conventional shader maps each pixel in the display 110 to one or more primitives and then to one or more texels in the texture map indicated by the one or more primitives corresponding to the pixel. The conventional shader reads the predetermined values of the one or more texels and shades each pixel based on the predetermined values of the texels, as well as other information including the observer point of view, location/orientations of light sources, locations of other objects in the scene, and the like.

In contrast, the shader 120 shades texels on a per-texel basis. Some embodiments of the GPU 105 include a mapper 125 that can map each pixel in the display 110 to texels in a texture map associated with a corresponding primitive provided by the video source 115. Although shown as a separate element in FIG. 1, the mapper 125 may also be an integrated portion of the shader 120. The texels associated with each pixel are added to a set of texels that are to be shaded by the shader 120. Some embodiments of the shader 120 shade the texels by modifying predetermined texel values (e.g., as indicated in the texture map) based on information provided by the video source 115 such as coordinates of the vertices of corresponding triangles, an observer point of view, locations or orientations of lighting sources, light data such as reflectance or a refractive index of objects in the scene, surface material data, shadow maps, and the like.

Some embodiments of the GPU 105 also include a cache 130 that is used to cache values of texels that have been previously shaded by the shader 120. Some embodiments of the cache 130 are implemented as registers or memory elements in the GPU 105. Although shown as an integrated portion of the GPU 105 in FIG. 1, some embodiments of the cache 130 are implemented in registers or memory elements outside of the GPU 105. The shader 120 may cache values of the shaded texels in the cache 130 and subsequently access the cached values instead of re-shading the texel for subsequent frames. The shader 120 may therefore selectively add texels to the set of texels that are to be shaded depending on whether a cached value of the shaded texel is available in the cache 130. In some embodiments, the shader 120 adds cached texels to the set of texels if a difference between the current frame number and the frame number of the cached texel is larger than a predetermined threshold indicating that the age of the cached texel is above a threshold and consequently the value of the cached texel may be stale. Some embodiments of the cache 130 may also cache values of texels that were shaded for a frame in a different video stream generated by a different camera or from a different point of view, a frame shaded by a different processing unit (e.g., another GPU), or other source of shaded texels. Thus, the shader 120 may bypass shading of texels that were previously shaded for another frame, by different camera, from a different point of view, or by a different GPU.

The shader 120 generates shaded values of the pixels based on the values of the texels that are shaded for the current frame and (if available) values of texels cached in the cache 130. For example, once the shader 120 completes shading the texels in the set of texels and caches the shaded values of the texels, the cache 130 contains all of the texels that map to the pixels in the display 110. The shader 120 may then read the values of the shaded texels from the cache 130 and perform texture filtering to finalize values of the pixels such as the color, hue, saturation, brightness, contrast, or other characteristics of the pixels. Techniques for texture filtering are known in the art. Some embodiments of the shader 120 may use some of the cached values of the shaded texels to determine values for more than one pixel.

Figure 2:
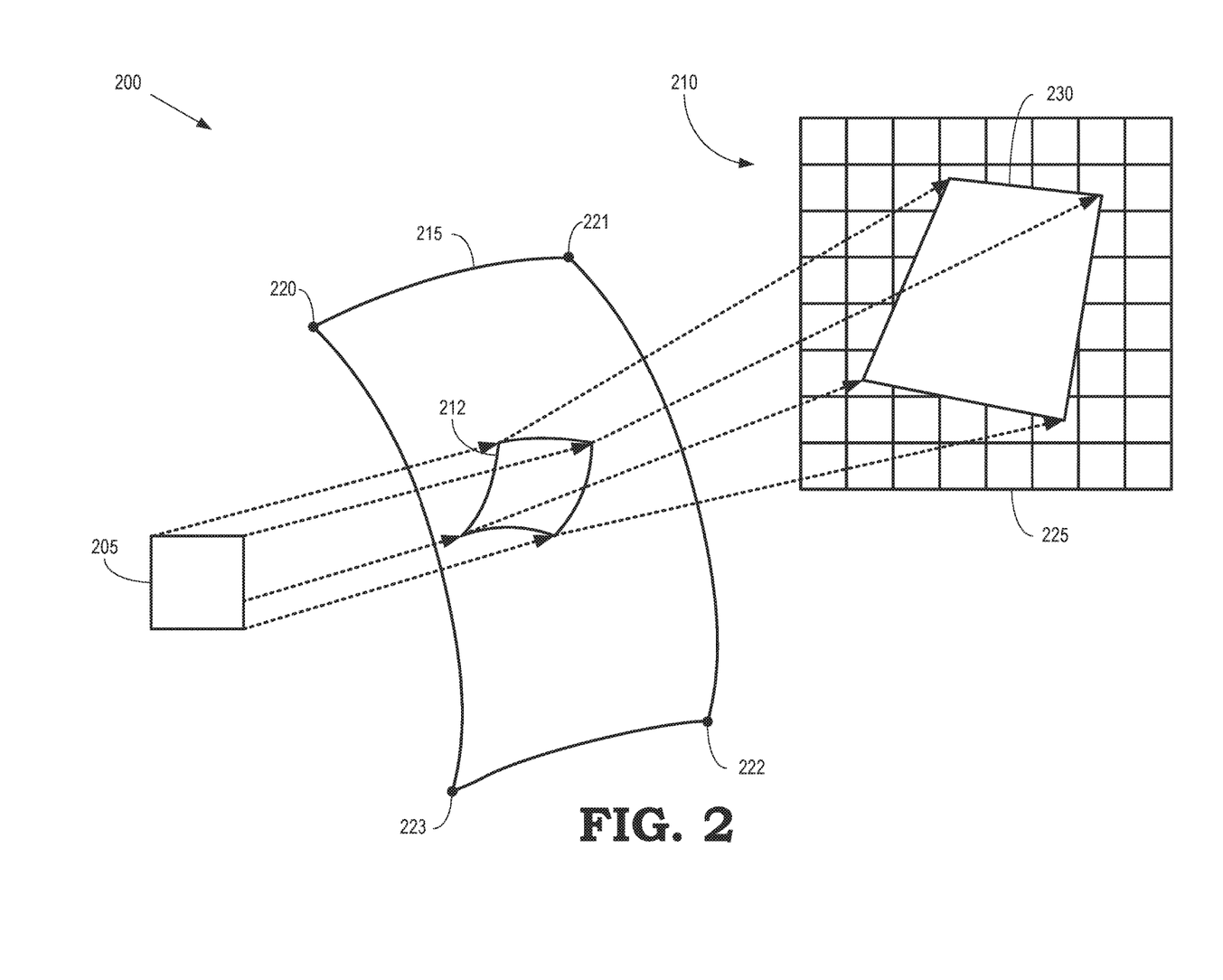
FIG. 2 is a diagram illustrating a mapping of a pixel to a texture according to some embodiments.

FIG. 2 is a diagram illustrating a mapping 200 of a pixel 205 to a texture 210 according to some embodiments. The pixel 205 may represent one of the pixels in some embodiments of the display 110 shown in FIG. 1. The pixel 205 is first mapped to a corresponding portion 212 of a primitive such as the polygon 215 that represents a portion of an object in a frame of a scene in a video stream. The polygon 215 is represented by its four vertices 220, 221, 222, 223 (referred to collectively as "the vertices 220-223"). However, other primitives represented by other numbers of vertices, such as triangles represented by three vertices, may also be used to represent objects.

The polygon 215 is associated with the texture map 210, which specifies a texture that is to be applied to the polygon 215. The texture map 210 is represented by a plurality of texels 225 (only one indicated by a reference numeral in the interest of clarity). The association between the primitive 215 and the texture map 210 may be indicated by the model that is used to represent the frame of the scene. For example, a video source such as the video source 115 shown in FIG. 1 may generate information associating each of the primitives a model of a frame of a scene with corresponding texture maps and provide this information to a shader such as the shader 120 shown in FIG. 1.

The region 212 associated with the pixel 205 is mapped to a corresponding region 230 of the texture map 210, which may also be referred to as mapping the pixel into texture space. The pixel 205 may then be represented by the texels 225 that (fully or partially) overlap the region 230. As discussed herein, the overlapping texels 225 may be shaded by the shader for use in determining the value of the pixel 205. In some embodiments, the texels 225 are shaded based on information included in the texture map and characteristics of vertices 220-223 of the associated primitive 215, e.g., characteristics provided by a video source. The texels 225 may therefore be associated with an index, such as a triangle index, that identifies its associated primitive 215. The index may be provided to the shader so that the shader can identify the vertices 220-223 of the primitive 215 associated with the texels 225, e.g., for interpolation.

Figure 3:
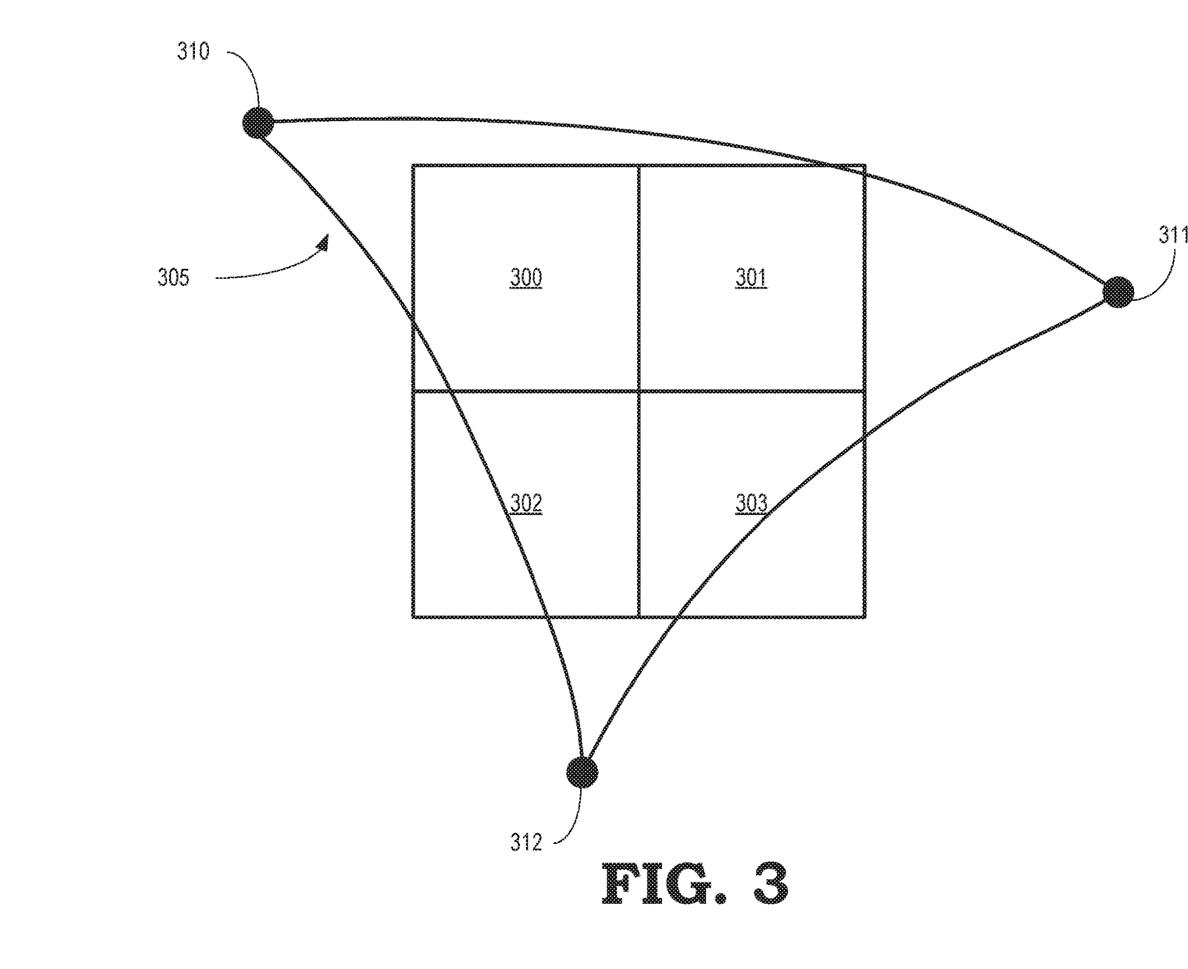
FIG. 3 is a diagram illustrating a plurality of texels and a primitive that has been mapped into texture space according to some embodiments.

FIG. 3 is a diagram illustrating a plurality of texels 300, 301, 302, 303 and a primitive 305 that has been mapped into texture space according to some embodiments. The texels 300, 301, 302, 303 are collectively referred to as "the texels 300-303" and they may represent some embodiments of the texels 225 shown in FIG. 2. The primitive 305 is a triangle that is defined by three vertices 310, 311, 312 (collectively referred to as "the vertices 310-312") and the positions of the vertices 310-312 are determined by coordinates in a 3-D space. The association of the texels 300-303 with the primitive 305 may be indicated by an index such as a triangle index. Colors or other characteristics such as hue, brightness, saturation, or contrast may be defined at the positions of the vertices 310-312, e.g., according to a model generated by a video source such as the video source 115 shown in FIG. 1. Values of the corresponding characteristics of the texels 300-303 may therefore be determined by interpolating from the values defined at the vertices 310-312. For example, bilinear interpolation may be used to determine values of characteristics of the texels 300-303 based on the locations of the texels 300-303 relative to the vertices 310-312 and values of the characteristics defined at the vertices 310-312.

Figure 4:
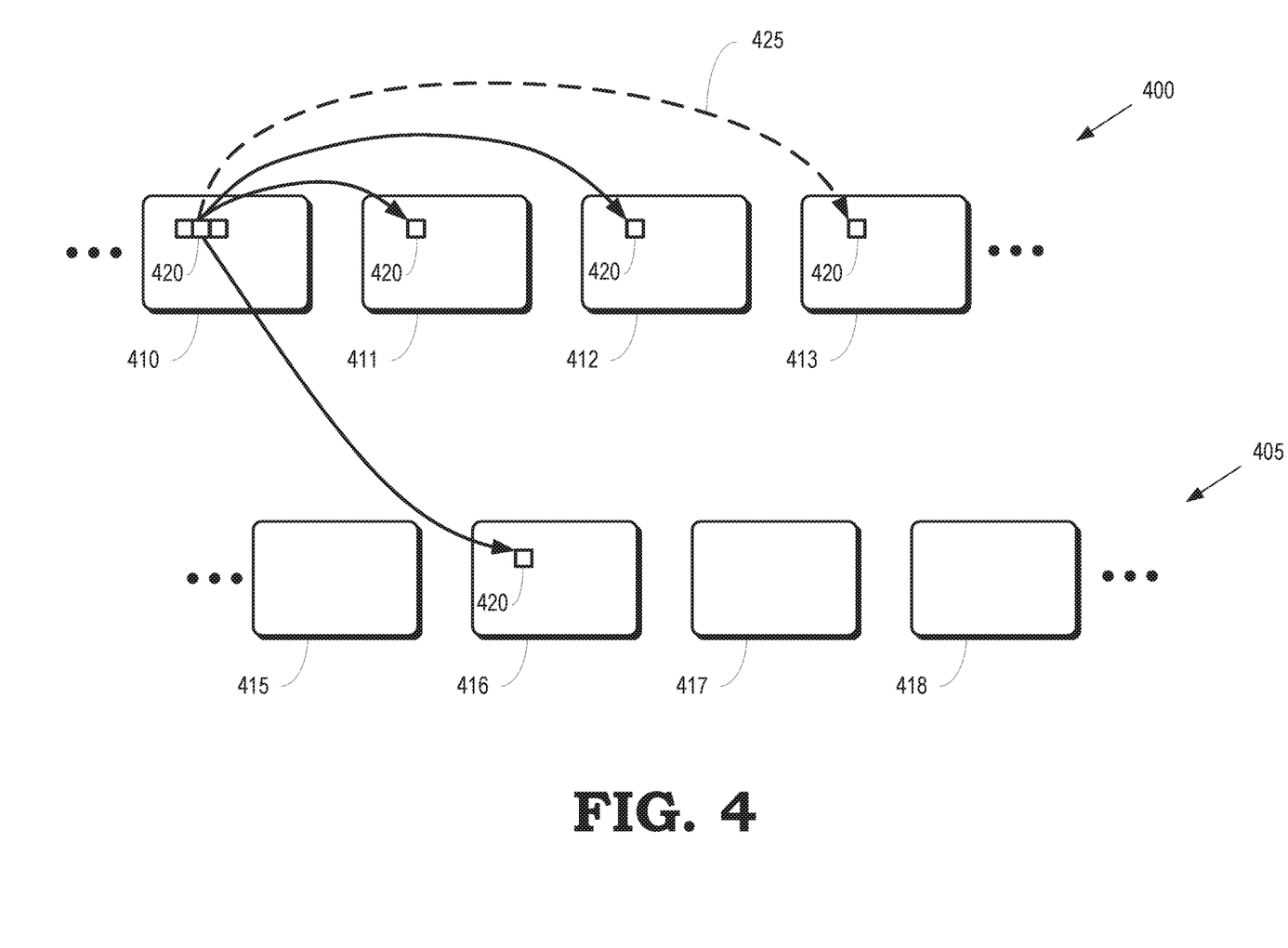
FIG. 4 is a diagram illustrating video streams of frames according to some embodiments.

FIG. 4 is a diagram illustrating video streams 400, 405 of frames according to some embodiments. The video stream 400 includes frames 410, 411, 412, 413 (collectively referred to as "the frames 410-413") that are processed by a GPU (such as the GPU 105 shown in FIG. 1) for presentation by a display (such as the display 110 shown in FIG. 1). The video stream 405 includes frames 415, 416, 417, 418 (collectively referred to as "the frames 415-418") that may be processed by the same GPU or a different GPU and the video stream 405 may be generated by the same video source (such as the video source 115 shown in FIG. 1) or by a different video source. The video stream 405 may be generated using a different camera or from a different point of view than the video stream 410.

As discussed herein, pixels in the frames 410-413 or 415-418 are mapped to corresponding texels in texture space such as the texel 420 associated with frame 410. A shader (such as the shader 120 shown in FIG. 1) shades the texel 420 for the frame 410. The shaded texel 420 is then cached so that the shaded texel 420 can be used to determine values of overlapping pixels in the frame 410 as well as other subsequent frames in the video stream 400, 405. For example, one or more pixels in the frame 411 maps to the texel 420. The shader may therefore use the cached value of the texel 420 to determine values of overlapping pixels in the frame 411 instead of re-shading the texel 420 for the frame 411. For another example, one or more pixels in the frame 412 maps to the texel 420. The shader may therefore use the cached value of the texel 420 to determine values of overlapping pixels in the frame 412 instead of re-shading the texel 420 for the frame 411.

The shader may selectively reuse cached values of the texel 420 based on a frame number of the frame 410, i.e., the frame that was being processed when the shader previously shaded the texel 420 and cached the shaded value. The frame number may also be cached with the texel 420. The cached frame number may be compared to the frame number of the frame that is currently being processed to determine whether to reuse cached values of the texel 420. For example, cached values of the texel 420 may be reused as long as the difference between the frame numbers is less than a threshold value, such as 2. The cached value of the texel 420 may not be reused by frames that have frames that differ from the cached frame number by more than the threshold value. For example, the frame number of the frame 413 differs from the frame number of the frame 410 by number that is larger than the threshold value. The cached value of the texel 420 may not be reused by the frame 413, as indicated by the dashed arrow 425. Instead, the shader re-shades the texel 420 and then caches the re-shaded value of the texel 420 for subsequent use in other frames.

Cached values of the texel 420 may also be reused by other video streams such as the video stream 405. For example, one or more pixels in the frame 416 maps to the texel 420. The shader (or another shader implemented in a GPU that is processing the video stream 405) may therefore use the cached value of the texel 420 to determine values of overlapping pixels in the frame 416 instead of re-shading the texel 420 for the frame 416. Frame numbers of the frames 410, 416 may be compared to determine whether the frame numbers differ by more less than the threshold value and the texel 420 can be selectively reused based on the comparison.

In some embodiments, a comparison is performed between a resolution of the cached values of the texel 420 and a resolution required to represent the one or more pixels in another frame that mapped to the texel 420 to determine whether to reuse the cached value. In some embodiments, the cached values of the texel 420 may be reused if the resolution of the pixels in the other frame is the same as the resolution of the cached values of the texel 420. In some embodiments, the cached values of the texel 420 may be reused if the resolution of the pixels in the other frame is lower or higher than the resolution of the cached values of the texel 420. For example, cached values of the texel 420 that have a higher resolution may be used to reconstruct, enhance, or augment lower resolution representations. The texel 420 may be re-shaded if the resolution of the pixels in the other frame is higher than the resolution of the cached values of the texel 420. The values of the re-shaded texel 420 may then be cached, perhaps in combination with the previously cached values of the texel 420 that was shaded at the other resolution.

Figure 5:
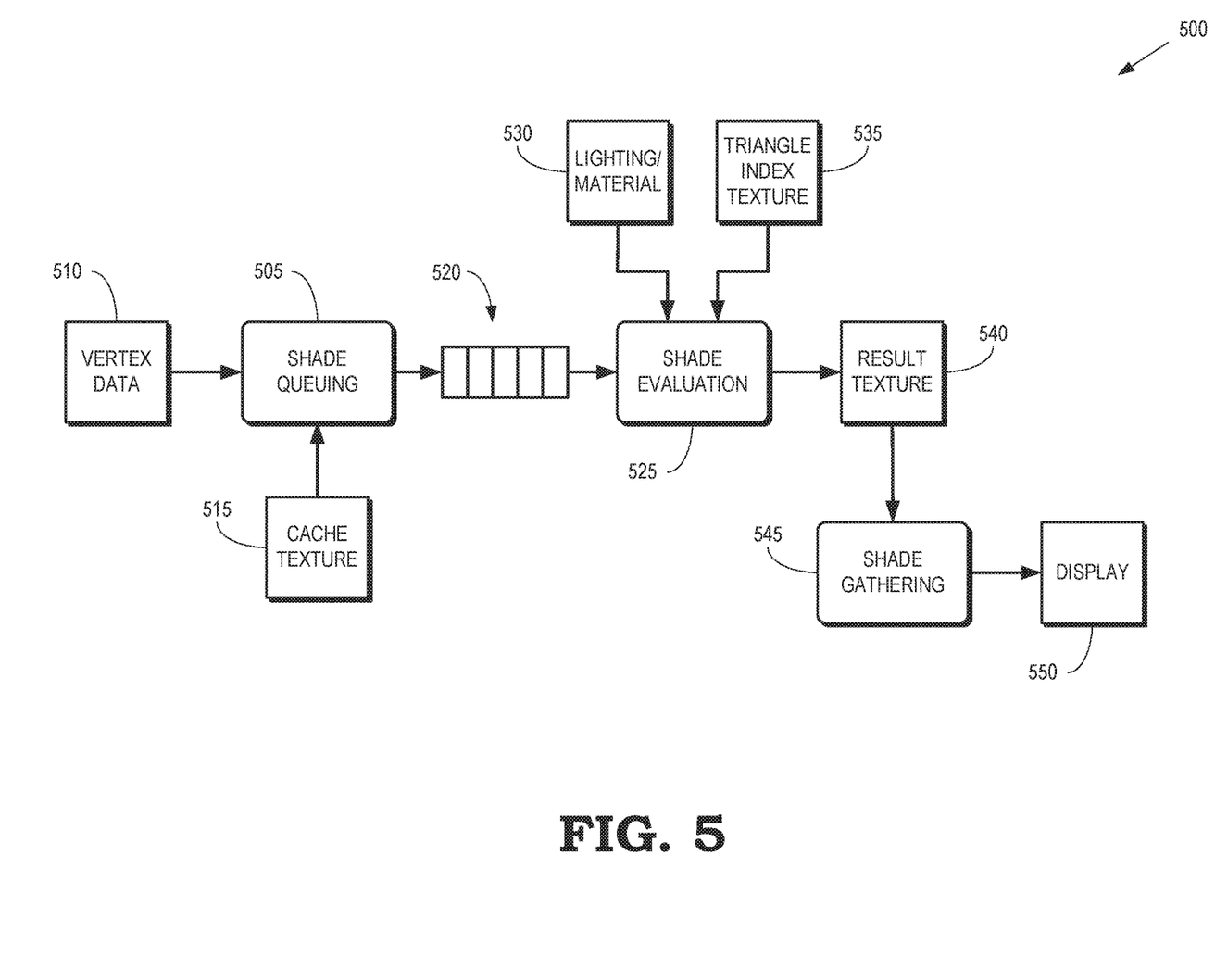
FIG. 5 is a block diagram of a shader that is used to shade texels in frames of a video stream according to some embodiments.

FIG. 5 is a block diagram of a shader 500 that is used to shade texels in frames of a video stream according to some embodiments. The shader 500 may be implemented in some embodiments of the processing system 100 shown in FIG. 1.

At block 505, the shader 500 performs a first geometry pass through the pixels to generate a set of texels as work items 520 for shading based on a mapping of pixels to one or more textures and a cached texture. For example, the shader 500 receives vertex data 510 that indicates the vertices of one or more primitives such as triangles generated based on a 3-D model of a scene. The shader 500 maps pixels to one or more of the primitives defined by the vertices in the vertex data 510. Each of the primitives is associated with a texture made up of a plurality of texels. A mapper associated with the shader 500 determines the texels that overlap the boundaries of the mapped pixel. The shader 500 then selectively adds the texels to the set of texels based on whether the texel has been previously shaded and cached as a part of a cached texture 515. In some embodiments, the shader 500 adds cached texels to the set of texels if the cached texel was calculated more than a threshold number of frames ago. The shader 500 may also add the cached texel to the set of texels if the cached texel was shaded at a different resolution than the resolution required for the current texel. For example, a cached texel may be added to the work items 520 if the corresponding cached texel was shaded at a different resolution, as indicated by a different mipmap level. In some embodiments, the shader 500 generates four pieces of work for each of the work items 520, one for each tap of a bilinear filter.

The work items 520 are then provided to a shade evaluation block 525 for shading. In some embodiments, the work items 520 are processed as groups of texels, such as 8×8 tiles of texels.

At block 525, the shader 500 shades the texels in the set of texels that make up the work items 520. The shade evaluation block 525 receives lighting/material data 530 that indicates the position or orientation of one or more light sources, characteristics of the light provided by the light sources, characteristics of materials associated with objects in the scene such as reflectance, refraction indices, degrees of transparency, and the like. The shade evaluation block 525 also receives a triangle index texture 535 that indicates texture values at the vertices of the primitives (in this case triangles) that represent objects in the scene. The shade evaluation block 525 uses triangle indices associated with each of the texels to identify the vertices of the triangles that overlap the texel. Values of the textures at the vertices may then be interpolated to the location of the texel to determine texture values at the location of the texel, as discussed herein. This information is combined with the lighting/material data 530 to shade the texels in the work items 520.

The shaded texels in the work items 520 are cached as a result texture 540. Caching the values of the shaded texels in the result texture 540 may include evicting one or more previously cached texels according to a cache replacement policy such as a policy that evicts the least-recently-used texel in response to receiving a newly shaded texel for caching. Some embodiments of the shader 500 also cache a frame number of the frame that is currently being processed in the result texture 540. The cached value of the frame number may be used to indicate an age of the texel, e.g., by comparing the cached frame number two a frame number of a texel in a subsequently processed frame.

At block 545, the shader 500 performs a second geometry pass through the set of pixels to retrieve values of the corresponding texels from the result texture 540. In some embodiments, the second geometry pass through the pixels of a first frame may be combined with the first geometry pass through the pixels of a second frame. For example, geometry passes may be combined by retrieving shaded texels that were computed for previous frames, generating shaded texels for one or more future frames, and using conventional shading for the current frame. In some embodiments, resolution levels (e.g., as indicated by levels of a mipmap) are chosen consistently with the levels used in the first geometry pass to ensure that all of the shaded texels needed to determine the pixel values are available in the result texture 540. Texture filtering is then applied to determine values of the pixels based on the texels retrieved from the result texture 540. Texture filtering techniques are known in the art. Values of the pixels are then provided to a display 550.

Figure 6:
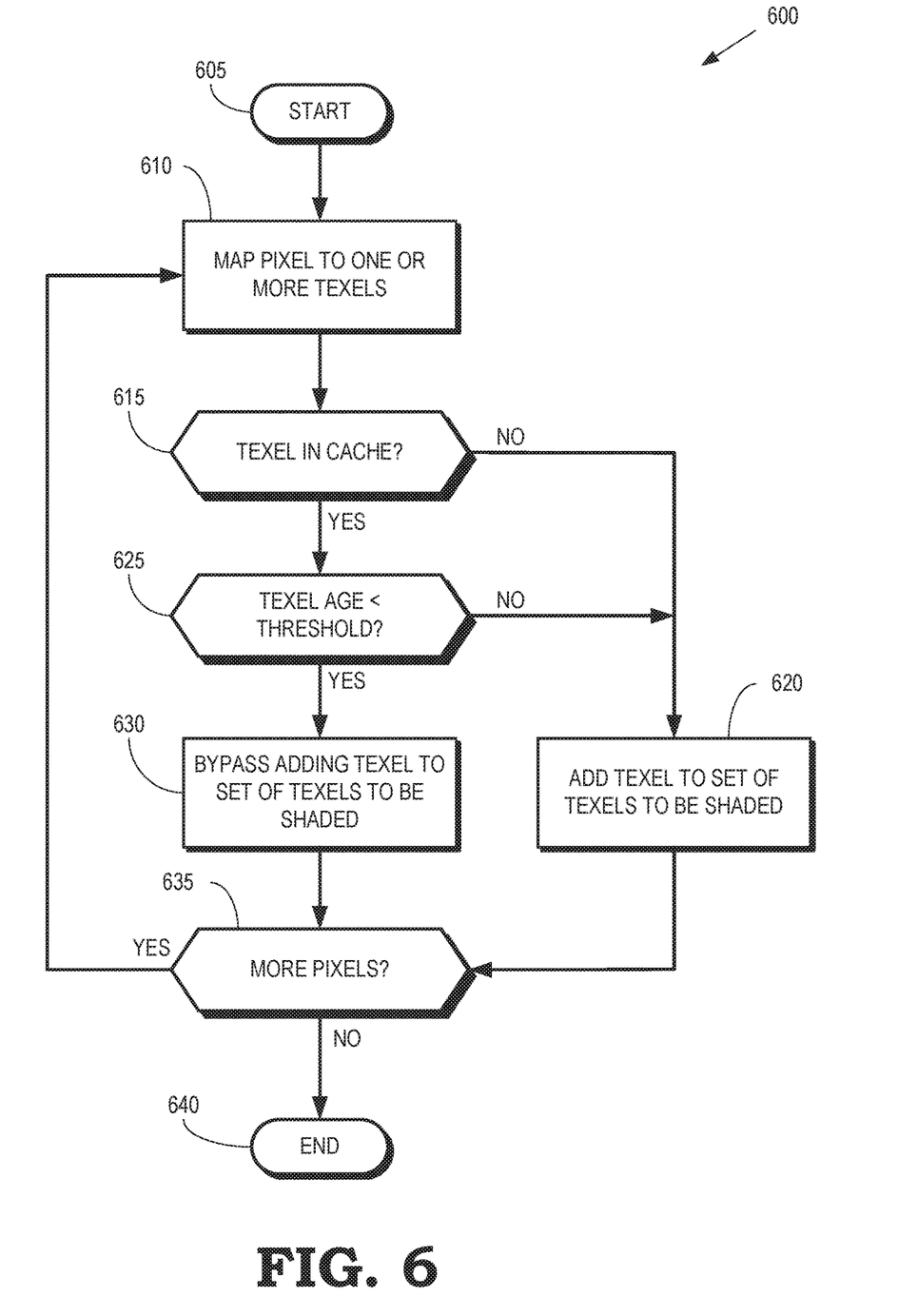
FIG. 6 is a flow diagram of a method for selecting texels as work items in a shader according to some embodiments.

FIG. 6 is a flow diagram of a method 600 for selecting texels as work items in a shader according to some embodiments. The method 600 may be implemented in some embodiments of the processing system 100 shown in FIG. 1 or the shader 500 shown in FIG. 5.

The method 600 starts at terminator 605 and flows to block 610. At block 610, a pixel is mapped to one or more texels in a texture map such as the texture map 210 shown in FIG. 2. At decision block 615, the shader determines whether previously shaded values of a texel that overlaps the pixel have been cached, e.g., in the result texture 540 shown in FIG. 5. In some embodiments, the shader also compares the resolutions used for the current texel and the previously shaded texel to determine whether the previously shaded texel can be used instead of re-shading the current texel. If not, the texel is added to the set of texels used to generate work items for the shader at block 620. If shaded values of the texel have previously been cached, the method 600 flows to decision block 625.

At decision block 625, the shader determines whether an age of the cached texel is less than a threshold. For example, the shader may compare a frame number of the frame that includes the texel that is currently being processed to a cached value of a frame number for the frame that included the cached texel. If the difference between the frame numbers is less than a threshold, which indicates that the age difference between the two frames is less than a corresponding threshold, the shader determines that the age of the cached texel is less than the threshold. In that case, the cached value of the texel can be used instead of re-shading the texel and so the shader bypasses (at block 630) adding the texel to the set of texels that is to be shaded for the current frame. The per-texel evaluation performed at decision blocks 615 and 625 may be iteratively repeated for all of the texels that are mapped to the current pixel.

At block 635, the shader determines whether there are more pixels to be evaluated. If so, the method 600 flows to block 610 and the next pixel is mapped to corresponding texels. If not, the method 600 flows to terminator 640 and the method 600 ends.

In some embodiments, the apparatus and techniques described above are implemented in a system comprising one or more integrated circuit (IC) devices (also referred to as integrated circuit packages or microchips), such as the 3-D graphics processing system described above with reference to FIGS. 1-6. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   mapping pixels of a first frame of a video stream to texels;
   selecting a subset of the texels for shading based on previously cached texels that were shaded for a second frame;
   shading the subset of the texels;
   caching the shaded subset of the texels with the previously cached texels; and
   determining values for the pixels of the first frame based on the cached texels.

2. The method of claim 1, wherein selecting the subset of the texels for shading comprises selecting a subset of the texels that differ from the previously cached texels.

3. The method of claim 2, wherein selecting the subset of the texels for shading comprises selecting the subset of the texels that differ from the previously cached texels in response to a first number of the first frame differing from a second number of the second frame by less than a threshold value.

4. The method of claim 3, wherein caching the shaded subset of the texels comprises caching texel values of the shaded subset of the texels and the first number of the first frame.

5. The method of claim 2, wherein selecting the subset of the texels for shading comprises selecting a texel that corresponds to a previously cached texel in response to a resolution of the texel differing from a resolution of the previously cached texel.

6. The method of claim 5, wherein shading the subset of the texels comprises shading the subset of the texels at a first resolution, and wherein caching the shaded subset of the texels comprises caching texel values determined at the first resolution.

7. The method of claim 1, further comprising:
associating the subset of the texels with triangle indices that indicate at least one triangle that overlaps at least one texel in the subset of texels.

8. The method of claim 7, wherein shading the subset of texels comprises interpolating values of at least one of a color, a position, a normal, a tangent, and a user-defined texture coordinate from triangle vertices of the at least one triangle to the subset of texels.

9. The method of claim 1, wherein the second frame is at least one of:
a subsequent frame in the first frame in the video stream;
a frame in a different video stream generated by a different camera or from a different point of view; and
a frame shaded by a different processing unit.

10. An apparatus comprising:
a processing unit to map pixels of a first frame of a video stream to texels, select a subset of the texels for shading based on previously cached texels that were shaded for a second frame, and shade the subset of the texels; and
a memory to cache the shaded subset of the texels with the previously cached texels, wherein the processing unit is to determine values for the pixels of the first frame based on the cached texels.

11. The apparatus of claim 10, wherein the processing unit is to select a subset of the texels that differ from the previously cached texels.

12. The apparatus of claim 11, wherein the processing unit is to select the subset of the texels that differ from the previously cached texels in response to a first number of the first frame differing from a second number of the second frame by less than a threshold value.

13. The apparatus of claim 12, wherein the processing unit is to cache texel values of the shaded subset of the texels and the first number of the first frame in the memory.

14. The apparatus of claim 11, wherein the processing unit is to select a texel that corresponds to a previously cached texel in response to a resolution of the texel differing from a resolution of the previously cached texel.

15. The apparatus of claim 14, wherein the processing unit is to shade the subset of the texels at a first resolution and cache, in the memory, texel values determined at the first resolution.

16. The apparatus of claim 10, wherein the processing unit is to associate the subset of texels with triangle indices that indicate at least one triangle that overlaps at least one texel in the subset of texels.

17. The apparatus of claim 16, wherein the processing unit is to interpolate values of at least one of a color, a position, a normal, a tangent, and a user-defined texture coordinate from triangle vertices of the at least one triangle to the subset of texels.

18. The apparatus of claim 10, wherein the second frame is at least one of:
a subsequent frame in the first frame in the video stream;
a frame in a different video stream generated by a different camera or from a different point of view; and
a frame shaded by a different processing unit.

19. A non-transitory computer readable storage medium embodying a set of executable instructions, the set of executable instructions to manipulate at least one processor to:
map pixels of a first frame of a video stream to texels;
select a subset of the texels for shading based on previously cached texels that were shaded for a second frame;
shade the subset of the texels;
cache the shaded subset of the texels with the previously cached texels; and
determine values for the pixels of the first frame based on the cached texels.

20. The non-transitory computer readable storage medium set forth in claim 19, wherein the at least one processor is to:
select the subset of the texels that differ from the previously cached texels in response to a first number of the first frame differing from a second number of the second frame by less than a threshold value.

* * * * *